(12) United States Patent
Choi et al.

(10) Patent No.: US 6,682,666 B2
(45) Date of Patent: Jan. 27, 2004

(54) OBJECT WITH RADIALLY VARYING REFRACTIVE INDEX, AND PRODUCING METHOD AND APPARATUS THEREOF

(75) Inventors: Jin Sung Choi, Daejun-Shi (KR); Han Sol Cho, Daejun-Shi (KR)

(73) Assignee: Samsung Electronics Co., Ltd., Kyungki-do (KR)

(*) Notice: Subject to any disclaimer, the term of this patent is extended or adjusted under 35 U.S.C. 154(b) by 149 days.

(21) Appl. No.: 09/915,349

(22) Filed: Jul. 27, 2001

(65) Prior Publication Data
US 2002/0031318 A1 Mar. 14, 2002

(30) Foreign Application Priority Data
Jul. 29, 2000 (KR) .......................... 2000-44027

(51) Int. Cl.[7] ............................... B29D 11/00
(52) U.S. Cl. ........................ 264/1.24; 264/2.1
(58) Field of Search ................. 264/1.24, 1.28, 264/1.7, 2.1

(56) References Cited
FOREIGN PATENT DOCUMENTS

| JP | A4-86603 | 3/1992 | |
|----|----------|--------|---|
| JP | 8-94859  | * 4/1996 | |
| JP | 8-146204 | * 6/1996 | |
| WO | WO97-29903 | 8/1997 | |

* cited by examiner

Primary Examiner—Mathieu D. Vargot
(74) Attorney, Agent, or Firm—Birch, Stewart, Kolasch & Birch, LLP

(57) ABSTRACT

Disclosed herein is a method of producing an object having a refractive index which varies radially from the central portion of the object toward the peripheral portion thereof. Also, an object produced by the method and an apparatus for carrying out the method are disclosed. The method comprises the steps of mounting in a rotatable reactor a solid central rotating body formed by polymerizing a first component; filling a liquid second component in the rotatable reactor around the central rotating body; rotating the central rotating body and/or the rotatable reactor to subject the first component to a dissolution, diffusion, and radial mixing into the second component; and polymerizing the dissolved first component and the second component.

22 Claims, 6 Drawing Sheets

OBJECT WITH RADIALLY VARYING REFRACTIVE INDEX, AND PRODUCING METHOD AND APPARATUS THEREOF

BACKGROUND OF THE INVENTION

1. Field of the Invention

The present invention relates in general to an object having a refractive index which varies radially from a central portion of the object toward a peripheral portion thereof, and a method and apparatus for producing the same. More particularly, the present invention relates to a plastic optical fiber preform having a refractive index which varies radially from the central portion of the object toward a peripheral portion thereof, and to a method and apparatus for producing the preform.

2. Description of the Prior Art

Optical fibers that are used as an optical transmission line are classified into single-mode fibers and multi-mode fibers depending on their optical signal transmission mode. Optical fibers that are currently used for long-range optical communication are mainly step-index single optical fibers based on quartz glass. These quartz glass optical fibers are fine fibers having a diameter of only about 5 to 10 $\mu$m. for this reason, it is very difficult and expensive to achieve an alignment and connection for those fibers.

On the other hand, multi-mode glass optical fibers having a larger diameter than that of the single-mode glass optical fibers may be used for short-range communication such as LAN (local area network), but they have a limited application because they have shortcomings in that they also have high costs for their connection and are fragile. Thus, for the short-range communication within a range of 200 M, for example LAN, metal cables such as twisted pair or coaxial cables are mainly used. However, such metal cables have an information transmission speed (or bandwidth) of about 150 Mbps at most, so that they cannot meet future standards of, for example, 625 Mbps that is a standard of ATM (Asynchronous Transfer Mode) in the 2,000's.

For these reasons, in the United States of America and Japan, etc., there have been made many efforts and investments over a past decade to develop plastic optical fibers which can be used for short-range communication such as LAN. By virtue of a flexibility of the polymer material, the plastic optical fibers can be reached the range of 0.5 mm to 1.0 mm in diameter, which is greater than those of glass optical fibers by 100 times or more. Thus, it is easy to achieve an alignment and connection for these plastic optical fibers. For such plastic optical fibers, polymer connectors manufactured by extrusion-moulding may also be used. Thus, a significant cost saving is expected. The plastic optical fibers can have either a step-index (SI) type having a refractive index profile in which the refractive index is stepwise radially changed, or a graded-index (GI) type having a refractive index profile in which the refractive index is gradually radially changed. The SI plastic optical fiber is high in its modal dispersity and thus cannot faster in its signal transmission speed (or bandwidth) than that of the cables, whereas the GI plastic optical fiber is low in its modal dispersity so that they can have a high transmission speed. Accordingly, the GI plastic optical fiber is known to be suitable for a short-range, high-speed communication medium by virtue of its large diameter and thus a cost-saving effect, and the low modal dispersity.

Prior processes for the production of the GI plastic optical fibers include an interfacial gel polymerization process which was first reported by Koike, a professor of Geio University in Japan, and several patent applications associated with the interfacial gel polymerization process (see, Koike, Y. et al., Applied Optics, Vol. 27, 486 (1988)). The interfacial gel polymerization process comprises providing a matrix polymer and a relatively low molecular weight dopant which is non-polymerizable with the matrix and has a refractive index different from the matrix, distributing the dopant in the matrix in a radial direction to make a preform with a radially varying refractive index, and heating and drawing the preform into fiber.

Meanwhile, Japanese Patent Application Laid Open Heisei 04-86603 discloses a method of producing a GI plastic optical fiber, comprising preparing a polymer fiber by an extrusion process, and then extracting a low molecular material contained in the polymer fiber in a radial direction or introducing a low molecular weight material into the polymer fiber in a radial direction.

Moreover, in 14th Annual Meeting of the Polymer Processing Society, Yokohama, Japan (June, 1998), Park and Walker have reported that a GI plastic optical fiber could be produced by a continuous process in which a refractive index profile is created by a mechanical mixing using a specific coextrusion die called "a GRIN die block".

In addition, WO 97/29903 of which inventors are Van Duijnhoven and Bastiaansen discloses a method of polymerizing monomers of a different density and refractive index under a centrifugal field, to create a density gradient, and thus a concentration gradient, thereby creating a refractive index gradient.

In order to maximize a bandwidth of a GI plastic optical fiber, the GI plastic optical fiber must have a radial refractive index profile close to a parabola as shown in FIGS. 1a and 1b. The refractive index profile is theoretically determined according to a power-law index model represented by the following equation (1) (see, Halley, P., Fiber Optics System, J. Wiley and Sons (1987)):

$$n(r) = n_1 \left[1 - 2\Delta\left(\frac{r}{a}\right)^g\right]^{\frac{1}{2}} \quad r \le a \quad (1)$$
$$n(r) = n_2 \quad r > a$$

where r represents a distance from a center of a cylindrical fiber, a represents a radius of the fiber, $n_1$ and $n_2$ represent indexes at r=0 and r=a, respectively, and $n_1$ is greater than $n_2$. $2\Delta = (n_1^2 - n_2^2)/n_1^2$, and g is a power-law index. According to the g value, the radial refractive index profile is determined. When the g value is 2, the power-law is named "parabolic law". At the g value approaching 2, an optimal refractive index profile can be reached at which the bandwidth is maximized. In is this case, when an optical signal as a delta function is input into the GI plastic optical fiber, the maximum bandwidth is given by the following equation (2):

$$B = \frac{c}{0.88Lnl} \frac{1}{\Delta^2} \quad (2)$$

wherein L is a length of the optical fiber, c is a velocity of light, n is a refractive index, and l is a Debye correlation length of a polymer used.

The bandwidth of the GI plastic optical fiber as theoretically described above is sensitively changed with the g value of the power law index model. Thus, in a process of producing the GI plastic optical fiber, the ability to control the g value, i.e., the ability to control a radial refractive index profile, is important to obtain a greater bandwidth of the prepared optical fiber. In all the existing GI preform producing processes other than the process by Park and Walker as described above, the radial refractive index profile is determined according to a diffusivity of a low molecular material or a relative chemical reactivity between the low molecular weight material and the high molecular weight material, and thus the process itself does not have the ability to control the g value (i.e., the ability to control the radial refractive index profile). On the other hand, the producing process by Park and Walker that is a mechanical mixing method is known to have the ability to control the g value by itself. However, this process results in a contamination of the optical fiber with foreign materials due to the pyrolysis of the polymer which is caused by complex structure of a specific extrusion die called "GRIN die block" and by a continuous coextrusion process. Thus, it is difficult for such processes to prepare the optical fiber having a low attenuation of an optical signal.

SUMMARY OF THE INVENTION

It is therefore an object of the present invention to provide to solve the above problems with the prior art and to provide a method of producing an object having a refractive index which varies radially from a central portion of the object to a peripheral portion thereof, thereby providing a new method of producing an GI plastic optical fiber which enables an easy control of a radial refractive index profile of the plastic optical fiber.

In one aspect of the present invention, there is provided a method of producing an object having a refractive index which varies radially from a central portion of the object toward a peripheral portion thereof, the method comprising the steps of: mounting in a rotatable reactor a solid central rotating body formed by polymerizing a first component; filling a liquid second component in the rotatable reactor around the central rotating body; rotating the central rotating body and/or the rotatable reactor to subject the first component to a dissolution, diffusion, and radial mixing into the second component; and polymerizing the dissolved first component and the second component.

In another aspect of the present invention, there is provided objects with a radially varying refractive index that are prepared by the method according to the first aspect.

In other aspect of the present invention, there is provided an apparatus of producing an object having a refractive index which varies radially from the central portion of the object toward the peripheral portion thereof, the apparatus comprising: a rotatable reactor mounted with a solid central rotating body formed by polymerizing a first component and filled with a liquid second component around the central rotating body, and the central rotating body being dissolved by a rotation of the central rotating body and/or the rotatable reactor to be mixed with the second component, and the resultant mixture of the dissolved central rotating body and the second component being polymerized to produce the object; means for driving the rotatable reactor; means for driving the central rotating body, and means for fixing the central rotating body to the driving means therefor.

BRIEF DESCRIPTION OF THE DRAWING

The above and other objects and aspects of the invention will be apparent from the following description of embodiments with reference to the accompanying drawings, in which.

DETAILED DESCRIPTION OF THE PREFERRED EMBODIMENTS

In order to produce an object having a refractive index which varies radially from the center of the object toward the peripheral portion thereof, the present invention comprises preparing a solid central rotating body by polymerizing a first component containing a precursor, or a monomer, or a polymer or a mixture thereof. The first component has relatively high refractive index, concentration and solid content. The central rotating body is mounted in a rotatable reactor, and a liquid second component containing a precursor, or a monomer, or a polymer or a mixture thereof is filled in the rotatable reactor around the mounted central rotating body. The second component has a relatively low refractive index, concentration and solid content. The central rotating body and/or the rotatable reactor are/is physically rotated so that the central rotating body is subjected to a dissolution, diffusion and radical mixing into the second component by a difference in solid content difference or polymer concentration between the two components.

More particularly, the present invention produces an object having a radially varying refractive index through the steps of: mounting in a rotatable reactor a solid central rotating body formed by polymerizing a first component; filling a liquid second component in the rotating reactor around the central rotating body; rotating the central rotating body and/or the rotatable reactor to subject the first component to a dissolution, diffusion, and radial mixing into the second component; and polymerizing the dissolved first component and the second component.

If there is no rotation of the central rotating body and/or the rotatable reactor, a diffusion by a difference in solid content or polymer concentration between the first and second components occurs according to the Fick's law represented by the following equation (3):

$$J = -D\nabla c \tag{3}$$

wherein J is a mass flux, D is a diffusion coefficient, and c is a polymer concentration.

Figure 1A:
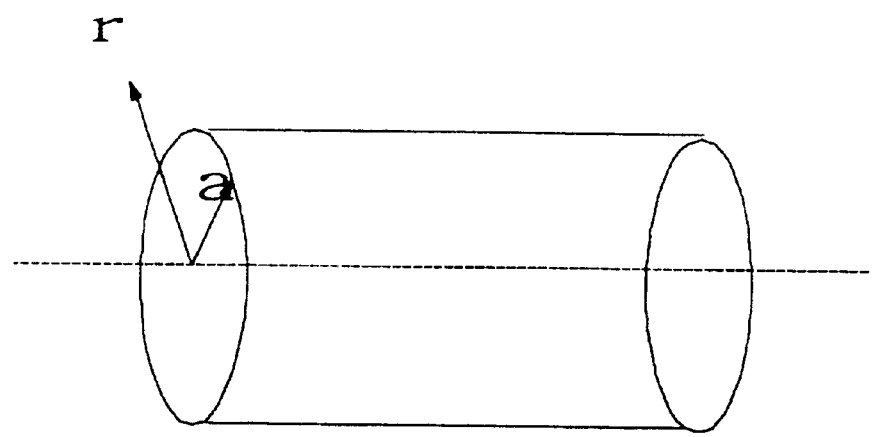
FIG. 1a is a schematic view showing a radially varying refractive index.
Figure 1B:
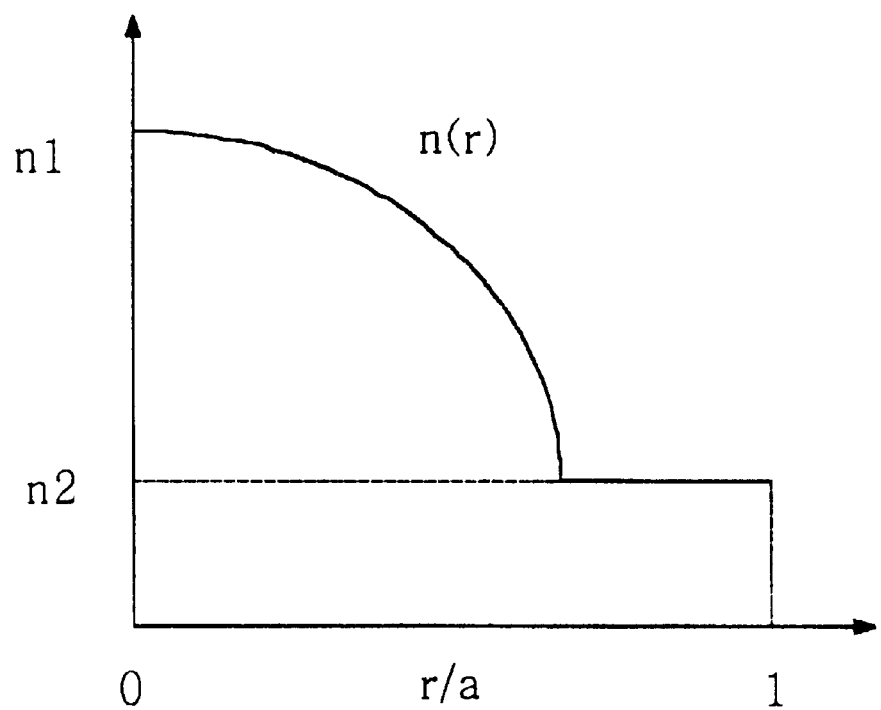
FIG. 1b is a curve showing a radial refractive index profile.
Figure 2A:
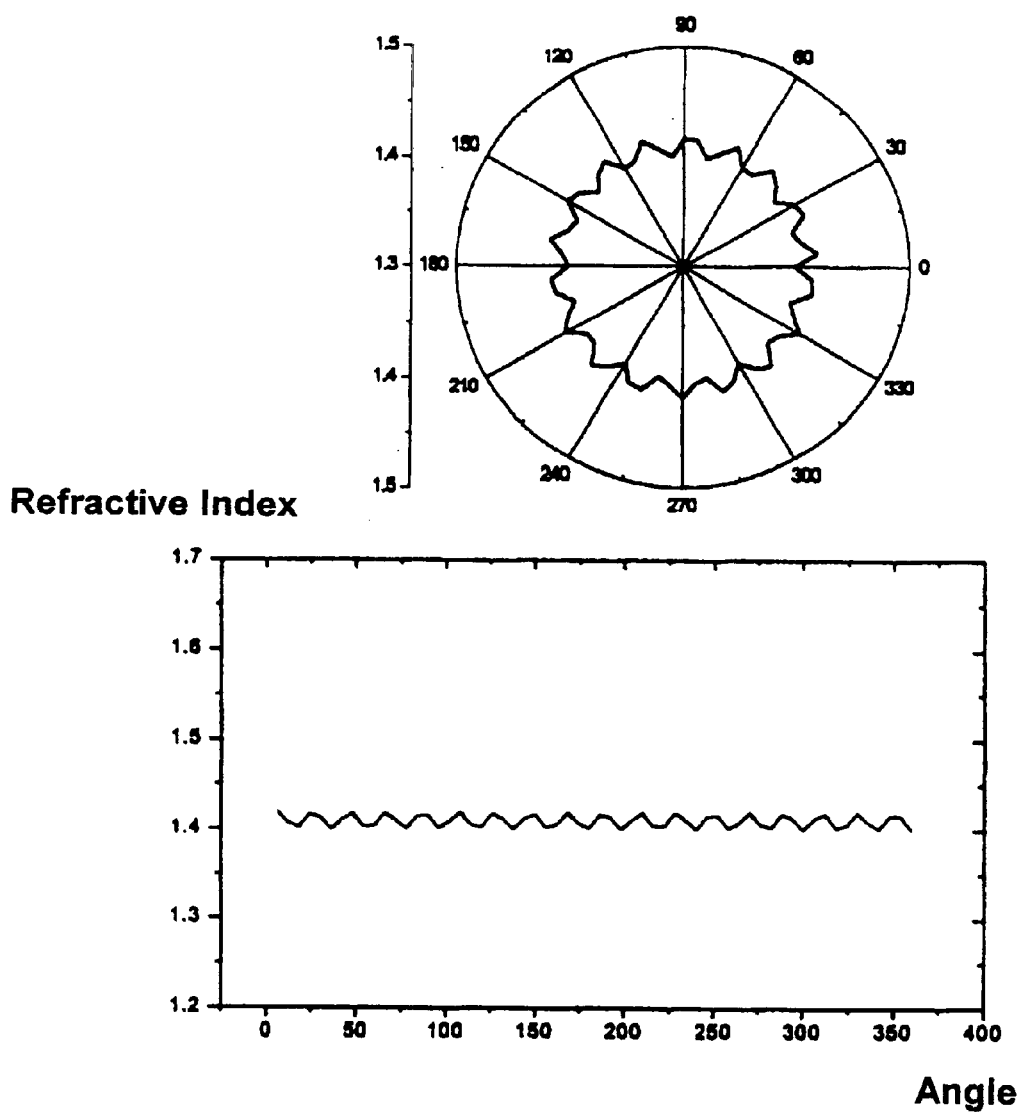
FIG. 2a is a graph showing a diffusion of a central rotating body in a state involving no rotation.

However, the diffusion dependent on only the polymer concentration difference is disadvantageous in that the diffusion irregularly occurs as shown in FIG. 2a, and also a diffusion velocity is low.

Figure 2B:
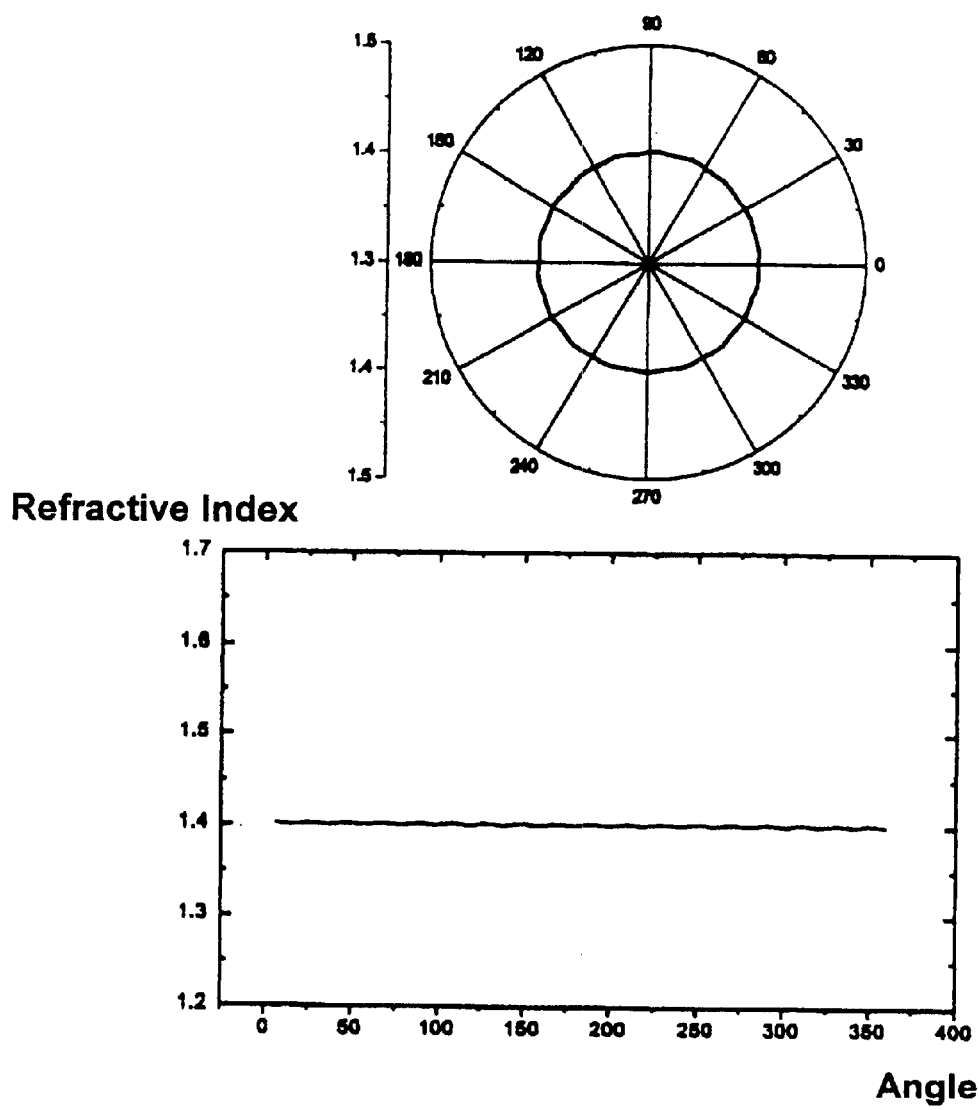
FIG. 2b is a graph showing a diffusion of a central rotating body in a state involving a rotation.

For this reason, the present invention induces a radial mixing by a rotation of the central rotating body and/or the rotatable reactor, so that a stable concentration profile as shown in FIG. 2b is achieved, thereby obtaining a desirable radially varying physical property profile.

Figure 3A:
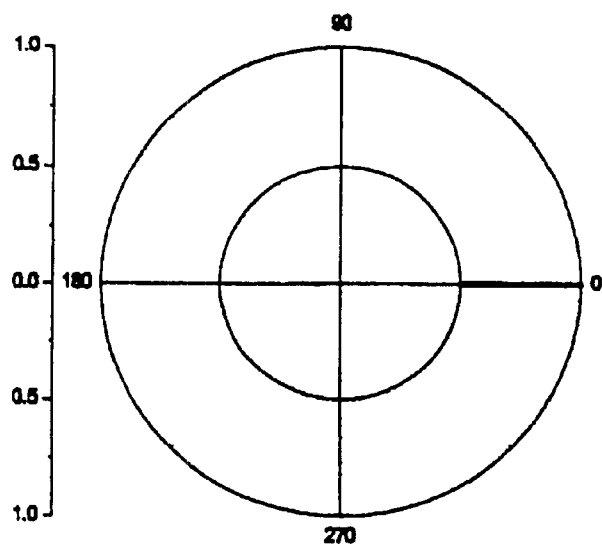
FIGS. 3a and 3b are concept diagrams showing a flowing state of a liquid around a central rotating body.
Figure 3B:
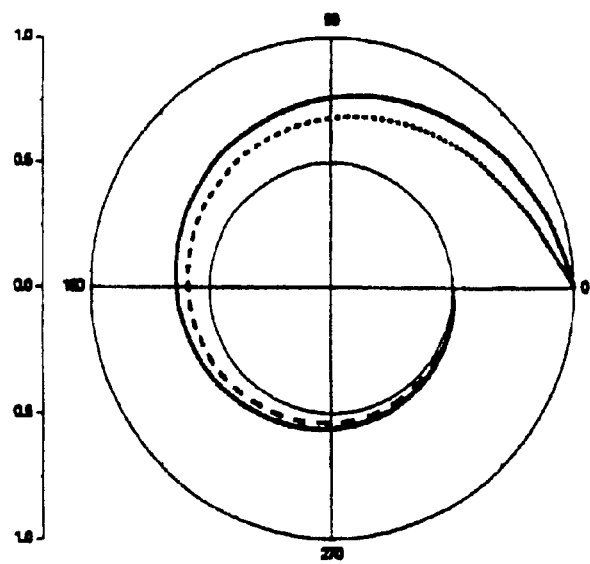
Figure 4:
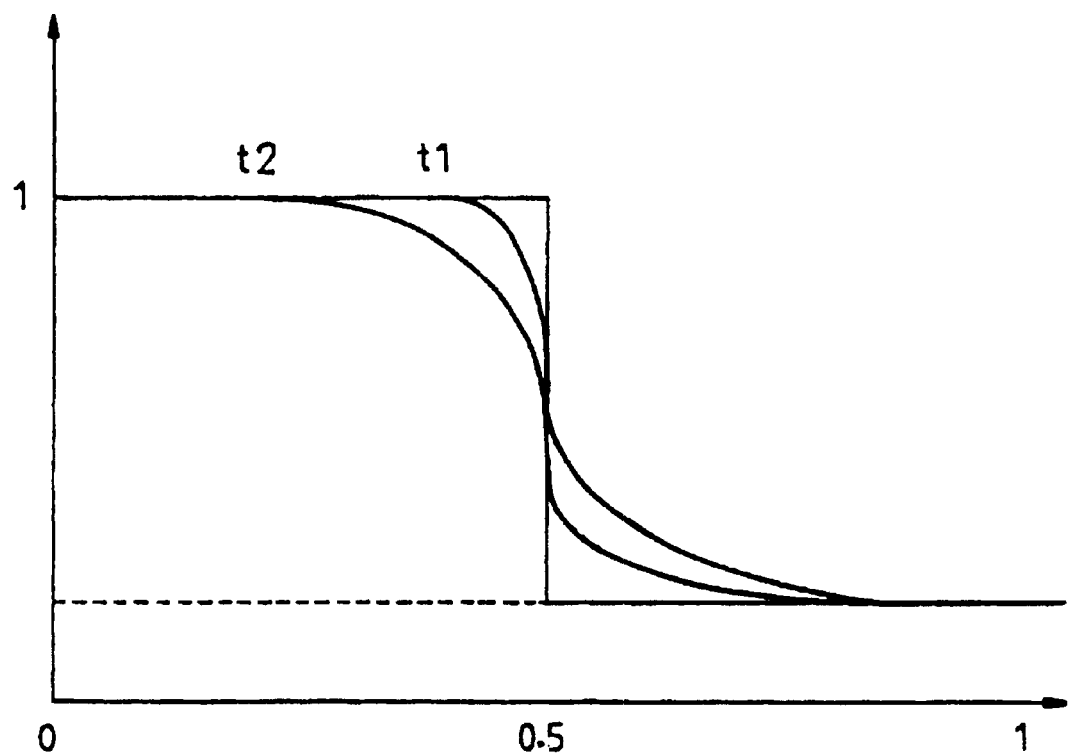
FIG. 4 is a graph showing a variation in polymer concentration according to a time and a position resulted from a dissolution, diffusion and radial mixing of a central rotating body.

The central rotating body is generally rotated at a low rotational speed within a range at which a radial flow by inertia (or centrifugal force) known as Taylor instability is not created. The initial second component filled in the rotatable reactor can be considered as a Newtonian fluid having a low viscosity, therefore, an upper limit for a steady rotational speed of the Newtonian fluid can be an approximate standard of an upper limit for a rotational speed in the method according to present invention when the central rotating body is rotated while the rotatable reactor is in a stationary state. The upper limit for the rotational speed of the Newtonian fluid is represented by the following equation (4):

$$\Omega_C \cong \frac{40\eta}{\rho\sqrt{R_o \Delta R^3}} \quad (4)$$

wherein $\Omega_c$ is the upper limit for the rotational speed, $\eta$ and $\rho$ is a viscosity and a density of the second component, respectively. $\Delta R = R_o - R_i$ where $R_o$ is an inner diameter of the rotatable reactor and $R_i$ is an outer diameter of the central rotating body.

Where the central rotating body is rotated at a rotational speed within a range not creating the Taylor instability, a velocity gradient field as represented by the following equation (5), in which the rotational speed at the center of the fluid is the highest and the rotational speed of the fluid at the inner surface of the reactor is zero, is created to occur a radial mixing in a rotational direction of the central rotating body:

$$u_\theta = \Omega r 1 - \frac{(R/r)^{2/n}}{1-(R_0/R_i)^{2/n}} \quad (5)$$

wherein $u_\theta$ is a rotational speed of the fluid, $\Omega_r$ is a rotational speed of the central rotating body, $R_o$ is an inner diameter of a rotatable reactor and $R_i$ is an outer diameter of the central rotating body. This is schematized in FIGS. 3a and 3b. FIG. 3a shows a line which is aligned in the radial direction in an initial non-rotating state, and FIG. 3b shows distributed positions of the line shown in FIG. 2 after the solid central rotating body is rotated by an angle of 360°. In FIG. 3b, a straight line is a flowing state for the Newtonian fluid, and a dotted line is a flowing state for a power law fluid. As can be seen in FIG. 3b, the mixing does not easily occur at the vicinity of the inner surface of the rotatable reactor, and particularly, a low shear force fluid such as the power low fluid is inferior in its mixing efficiency at the vicinity of the inner surface of the rotatable reactor.

Thus, where the central rotating body is continued to rotate for a desired time using the phenomena according to the equations (4) and (5), a radial mixing of the first and second components is progressed gradually from an interface between the first and second components, such that the first component is diffused toward the inner surface of the rotatable reactor while the second component is diffused toward the central portion of the rotating body. Accordingly, the polymer is distributed in such a manner that it has a concentration gradient from the inner surface to the central portion of the rotatable reactor. Polymerization of the distributed polymer produces an object with a refractive index profile in which the refractive index varies radially from the center of the object toward the peripheral portion thereof.

In the prior art, the refractive index profile of the plastic optical fiber was determined only by chemical properties of the optical fiber material used, such as dispersability, affinity, and the like. However, the present invention has a significant characteristic in that it additionally uses the physical phenomenon that is the radial mixing occurring in a circumferential direction, thereby controlling the refractive index profile. The radial mixing phase can be changed by an influence of an inertial force generated by controlling a rotational speed and direction of the central rotating body and rotatable reactor. Thus, controlling of the refractive index profile can be achieved by varying the rotational speed and direction of each of the central rotating body and the rotatable reactor, and thus by varying the radial mixing phase of the polymer. For example, the rotatable reactor containing the central rotating body may be rotated the same direction as or the opposite direction to the central rotating body, and each of the rotatable reactor and the central rotating body may be rotated at a constant or variable speed. Concretely, the rotational speed may be controlled in such a manner that it is changed into the form of a step function or a sign function, etc.

It is also possible to use another method to control the radial refractive index profile. In this alternative method, some of the central rotating body are cut before the second component is filled in the rotatable reactor. The cut pieces are dissolved in the second component, and then filled in the rotatable reactor. In such a method, as the polymer material of the first component is already dissolved in the second component, the dissolution, diffusion and radial mixing states are changed to allow another form of a radial refractive index profile to be achieved.

In addition, it is also possible to use another method which comprises mounting in the rotatable reactor a polymer of the first component and the second component, as a central rotating body, the polymer being prepared according to one of the above methods; filling a third component in the rotatable reactor, the third component being low in its refractive index, solid content and concentration as compared to the second compound; and carrying out the dissolution, diffusion, radial mixing, and polymerization, as described above. This enables a new form of a radial refractive index profile to be achieved. In this case, the polymer of the first and second components may be not only used in the method as such, but also used in a state where it was reduced in its diameter by drawing the polymer of the first and second components.

As a rule, the central rotating body and/or the rotatable reactor rotates at a rotational speed within a speed range not creating the Taylor instability, so as to occur the dissolution of the solid central rotating body together with the radial mixing thereof. However, it is possible to use a method in which the rotational speed is initially maintained at a high level to dissolve the solid, central rotating body, after which the rotational speed is maintained at a low level to diffuse a viscose material distributed around the solid, central rotating body.

In addition, the radial refractive index profile may also be influenced by factors, such as the kind and content of materials constituting the first and second components, a difference in physical property between the first and second components, a ratio of the central rotating body diameter to the rotatable reactor diameter, temperature of the rotatable reactor, configurations of the central rotating body and the rotatable reactor, and the like.

Polymerization of the first and second components that were mixed with each other to achieve the refractive index distribution as described above can produce an object with a refractive index profile in which the refractive index varies radially from the center of the object to the periphery thereof. For example, where the first and the second components are monomers or precursors, they can be polymerized by a method using a heating or an ultraviolet irradiation, etc., thereby being solidified. Where the first and second components are thermoplastic polymers that were heated to a temperature of their melting point or glass transition temperature or above, they are cooled slowly to be changed into solid materials.

In another aspect, the present invention provides an apparatus for carrying out the above method, the apparatus comprising a rotatable reactor, means for driving the reactor, a means for driving a central rotating body, and means for mounting the central rotating body in the driving means therefor. The apparatus for producing objects with radially varying physical properties further comprises means for controlling the temperature of the rotatable reactor. This temperature-controlling means serves to control temperature of the central rotating body dissolved.

Each of the means for driving the central rotating body and the means for driving the rotatable reactor include a motor which can be controlled in its rotational speed. Also, these means further include means for applying power to the motor, and serve to rotate the central rotating body and the rotatable reactor, respectively. The rotatable reactor can be formed of a tube made of glass, or polymer such as Teflon, polypropylene, polyethylene, nylon and the like, or a steel tube plated with chromium or gold, or a laminated or composite structure of these materials. These materials for the rotatable reactor must be not dissolved or swollen in the reactants, and must have a heat resistance so as to resist the reaction temperature.

Figure 5:
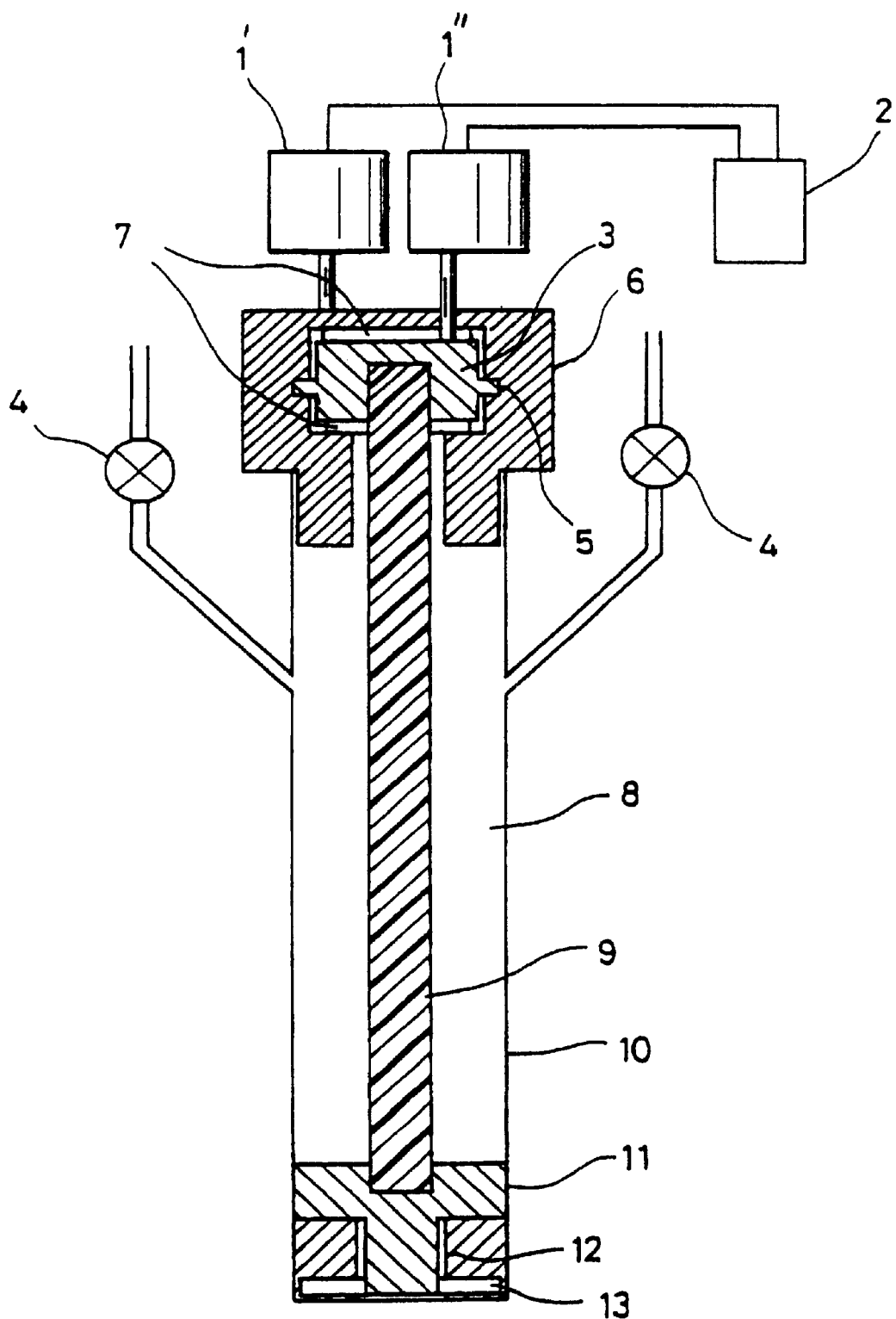
FIG. 5 is a cross-sectional view showing a producing apparatus of an object with radially varying index according to an embodiment of the present invention.

FIG. 5 shows a producing apparatus of an object with a radially varying refractive index according to one embodiment of the present invention. Referring to FIG. 5, a central rotating body 9 is mounted to an upper hold 3 at its upper end and a lower hold 11 at its lower end, and thereby to be mounted in a rotatable reactor 10. The apparatus includes motors 1' and 1" for driving the rotatable reactor 10 and the central rotating body 9, respectively. Also, the apparatus includes a motor control unit 2 serving to control the rotational speeds of the rotatable reactor 10 and the central rotating body 9. A second component 8 is filled in the rotatable reactor 10 through a connector connected to the rotatable reactor 10. Also, the reference numeral 5 represents a joint, and the reference numeral 7 represents a bearing.

A method for producing a plastic optical fiber preform using the method described above will now be described in detail.

In the method of the present invention, the plastic optical fiber preform with a radially decreasing refractive index is produced in such a manner that it has a graded refractive index distribution.

Each of the first component and the second component contains at least one monomer, homopolymer, copolymer or mixture thereof. The first component and the second component are preferably controlled in their refractive index to have a difference ranging from 0.02 to 0.001.

As the monomer for the first and second component, there can be used at least one selected from the group consisting of methyl methacrylate, benzyl methacrylate, phenyl methacrylate, 1-methylcyclohexyl methacrylate, cyclohexyl methacrylate, chlorobenzyl methacrylate, 1-phenylethyl methacrylate, 1,2-diphenyl methacrylate, diphenylmethyl methacrylate, furfuryl methacrylate, 1-phenylcyclohexyl methacrylate, pentachlorophenyl methacrylate, pentabromophenyl methacrylate, styrene, perfluoro-2,2-diphenyl-1,3-dioxole, tetrafluoroethylene, chlorotrifluoroethylene, vinylidene fluoride, hexafluoropropylene, trifluoroethylene, perfluoroallylvinylether, and fluorovinylether. Homopolymers of these monomers may also be used in the present invention.

As the copolymer for the first and second components, there can be used at least one selected from the group consisting of copolymers of the above monomers, a methyl methacrylate (MMA)-benzyl methacrylate (BMA) copolymer, a styrene-acrylonitrile (SAN) copolymer, an MMA-2,2,2-trifluoroethylmethacrylate (TFEMA) copolymer, an MMA-2,2,3,3,3-pentafluoropropylmethacrylate (PFPMA) copolymer, an MMA-1,1,1,3,3,3-hexafluoroisomethacrylate (HFIPMA) copolymer, an MMA-2,2,3,3,4,4,4-heptafluorobutylmethacrylate (HFBMA) copolymer, a TFEMA-PFPMA copolymer, a TFEMA-HFIPMA copolymer, and a TFEMA-HFBMA copolymer.

Moreover, as the copolymer for the first and second components, there may also be used bipolymers or terpolymers of perfluoro-2,2-dimethyl-1,3-dioxole as a first monomer and one or more monomers selected from the group consisting of tetrafluoroethylene, chlorotrifluoroethylene, vinylidenefluoride, hexafluoropropylene, trifluoroethylene, perfluoroallylvinylether and fluorovinylether, as a second and/or third monomers.

The monomers for the first component and the second component may be used together with a small amount of a chain transfer agent and a polymerization initiator. Preferably, the chain transfer agent is used at the amount of 5% by weight or below based on the weight of the monomer, and the polymerization initiator is used at the amount of 2% by weight based on the weight of the monomer.

As the polymerization initiator, there can be used one or more selected from the group consisting of 2,2'-azo-bis (isobutyronitrile), 1,1'-azo-bis(cyclohexanecarbonitrile), di-tert-butyl peroxide, lauroylperoxide, benzoylperoxide, tert-butyl peroxide, azo-tert-butane, azo-bis-isopropyl, azo-n-butane, and di-tert-butyl peroxide.

As the chain transfer agent, there can be used one or more selected from the group consisting of n-butyl-mercaptan, lauryl mercaptan, and dodecyl mercaptan.

The first component consisting of the monomers, homopolymers, copolymers or a mixture thereof, and the polymerization initiator and the chain transfer agent, etc. is subjected to polymerization to produce a solid central rotating body. The produced central rotating body is mounted in the rotatable reactor. A second component is then filled in the rotatable reactor around the central rotating body. The central rotating body and/or the rotatable reactor are/is rotated at a constant or variable velocity so that the solid first component is subjected to a dissolution, diffusion and radial mixing into the liquid second component. During this rotation step, the relative rotational speed of the central rotating body to the rotatable reactor is preferably maintained at a speed range at which the Tailor instability is not created. However, the relative rotational speed of the central rotating body is preferably maintained at the velocity or less according to the equation (4) as described above, and particularly at a range of 1 to 1000 rpm. Also, to facilitate the dissolution and diffusion of the first component, the rotatable reactor in the rotation step is maintained at a temperature of −10° C. to 70° C. at which the diffusion of the monomers can be facilitated while the polymerization of the monomers does not occur. As described above, the refractive index profile of the optical fiber preform can be controlled by adjusting parameters affecting the radial mixing, such as a rotational speed, an outer diameter of the central rotating body, a temperature of the rotatable reactor, a mixing ratio of the monomers contained in the first component or the second component.

The outer diameter of the central rotating body is preferably in the range of 1% to 70%, and more preferably 30% to 50%, relative to the inner diameter of the rotatable reactor. The rotation of the central rotating body and/or the rotatable reactor is preferably ceased at a point of time at which a central rotating body portion remaining after the dissolution of the central rotating body into the second component has a diameter of 0.01% to 90%, and more preferably 0.01% to 20%, relative to the outer diameter of the initial central rotating body. To create the refractive index profile reaching the center portion of the preform, the rotation is preferably ceased when the central rotating body has the smallest possible diameter. However, once the central rotating body was all dissolved, further rotating the central rotating body and/or the rotatable reactor is meaningless.

The rotatable reactor which contains a mixture of the first component and the second component so formed is separated from the driving means thereof, and the mixture in the rotatable reactor is subjected to an additional polymerization to produce a plastic optical fiber preform. This additional polymerization can be carried out while rotating the rotatable reactor at a low velocity or without rotation of the rotatable reactor. Moreover, the additional polymerization is carried out at a temperature of 30 to 120° C. for 10 to 100 hours. A most preferred polymerization time is 24 to 48 hours.

The plastic optical fiber preform is preferably subjected to a drying process to remove unreacted monomers contained therein such that the preform contains the unreacted monomer at the amount of 4% by weight or less. These unreacted monomers or additives can result in the formation of bubbles during a process for hot-drawing the object with a radially varying refractive index into a plastic optical fiber having a decreased volume. This occurs a serious scattering of the plastic optical fiber as found by measuring a light loss thereof. The drying process is carried out at a temperature of 50 to 150° C. for 24 to 48 hours under a reduced pressure of 5 mmHg while elevating stepwise the temperature.

Preferably, the polymer preform after polymerized has a molecular weight ranging from 3,000 to 1,000,000 and a molecular weight distribution ranging 1.0 to 6.0.

The produced preform may be additionally provided with a cladding layer, a protecting layer. This cladding layer serves to facilitate a going straight ahead of light and to protect the created refractive index profile during the hot-drawing process. The protecting layer forms 30% by volume or less of the total volume of the preform. As a material constituting the protecting layer, there can be used the same monomer, homopolymer or copolymer as described above regarding the production of the preform.

The preform thus prepared is hot-drawn at a hot-drawing temperature represented by the following equation using a plastic optical fiber drawing apparatus to produce an optical fiber:

Hot-drawing temperature=Secondary transition point (° C.) of preform-constituting copolymer +10° C. to 100° C.

The preform is mounted in the plastic optical fiber drawing apparatus and aligned in the vertical and horizontal directions. The aligned preform moves downwardly while being passed through an oven which is maintained at a desired temperature. It is then subjected to a cooling step under atmosphere and a winding step, thereby producing a plastic optical fiber.

The following examples are for further illustration purposes only and in no way limit the scope of this invention.

EXAMPLE 1

A monomer mixture consisting of methylmethacrylate benzylmethacrylate of the 60:40 weight ratio was mixed with 1.0% by weight of 2,2'-azo-bis(isobutyronitrile), as a polymerization initiator, and 0.5% by weight of n-butyl mercaptan, as a chain transfer agent, based on to the weight of the monomer mixture. The resulting mixture was filled in a cylindrical mold having an inner diameter of 3 cm by filtration, and polymerized for 24 hours while elevating the temperature of the mold from 30° C. to 100° C.

After the completion of the polymerization, the produced central rotating body was recovered from the mold and dried under vacuum to remove unreacted monomers. Then, the central rotating body was mounted in the central portion of a rotatable reactor having a 5 cm diameter. After this, the rotatable reactor was filled with a second component. The second component consisted of a monomer mixture of methylmethacrylate benzylmethacrylate of the 80:20 weight ratio, which was mixed with 1.0% by weight of 2,2'-azo-bis(isobutyronitrile), as a polymerization initiator, and 0.5% by weight of n-butyl imercaptan, as a chain transfer agent, based on to the weight of the monomer mixture.

A producing apparatus including the resulting rotatable reactor was set as shown in FIG. 5. The rotatable reactor was then maintained at a temperature of 0° C. to 10° C. while the central rotating body was rotated at a rotation speed of 5 rpm for 30 minutes, thereby dissolving the solid, central rotating body into the second component.

Next, the rotatable reactor was separated from the apparatus, and transferred into an oven. In the oven, the content in the rotatable reactor was polymerized by increasing slowly the temperature from 30° C. to 100° C. over 48 hours. The polymerized preform was recovered and dried under a vacuum of 5 mmHg at 75° C. for 48 hours. When the produced preform was measured for its molecular weight by GPC, it was found that molecular weights at the central portion and periphery of the preform were 70,000 and 80,000, respectively, similar to each other. Moreover, measurement for a refractive index of the preform using an interference microscope showed that a refractive index at the central portion of the preform is about 1.533 which was radially gradually decreased toward the peripheral portion having a refractive index of about 1.515.

The preform produced as described above was drawn into an optical fiber of a 1 mm thickness at an oven exterior temperature of 500° C. and an oven interior temperature of 190° C. using a plastic optical fiber drawing apparatus. When the light loss of the optical fiber was using an actinometer (Photom 205-A, Mitsbishi Rayon Co., Japan), it was found to be 200 dB/km at a wavelength of 650 nm under an LED light source.

EXAMPLE 2

A monomer mixture consisting of methylmethacrylate benzylmethacrylate of a 70:30 weight ratio was mixed with 0.05% by weight of 2,2'-azo-bis(isobutyronitrile), as a polymerization initiator, and 0.2% by weight of n-butyl mercaptan, as a chain transfer agent, based on to the weight of the monomer mixture. The resulting mixture was filled in a cylindrical mold having an inner diameter of 3 cm by filtration, and polymerized for 24 hours while elevating the temperature from 30° C. to 100° C.

After the completion of the polymerization, the produced central rotating body was recovered from the mold and dried under vacuum to remove unreacted monomers. Then, the central rotating body was mounted in the central portion of a rotatable reactor having a 5 cm diameter. After this, a first component piece which was cut from the central rotating body before mounting the central rotating body in the rotatable reactor was added to a second component and dissolved. The second component consisted of a monomer mixture of methylmethacrylate benzylmethacrylate of the 80:20 weight ratio, which was mixed with 1.0% by weight of 2,2'-azo-bis(isobutyronitrile), as a polymerization initiator, and 0.5% by weight of n-butyl mercaptan, as a chain transfer agent, based on to the weight of the monomer mixture. Afterwards, the second component containing the first component piece dissolved therein was filled in the rotatable reactor around the central rotating body.

A producing apparatus including the resulting rotatable reactor was set as shown in FIG. 5. The rotatable reactor was then maintained at a temperature of 0° C. to 10° C. while the central rotating body was rotated at a rotation speed of 5 rpm for 30 minutes, thereby dissolving the solid central rotating body into the second component.

Next, the rotatable reactor was separated from the system, and transferred into an oven. In the oven, the content in the rotatable reactor was polymerized by increasing slowly the temperature from 30° C. to 100° C. over 48 hours. The polymerized preform was recovered from the rotatable reactor and dried under a vacuum of 5 mmHg at 75° C. for 48 hours. When the produced preform was measured for its molecular weight by GPC, it was found that molecular weights at the central portion and periphery of the preform were 100,000 and 110,000, respectively, similar to each other.

Then, the produced preform as a central rotating body was mounted in the central portion of the rotatable reactor again. After this, preform pieces which were cut from the preform before mounting the preform in the rotatable reactor was added to a third component and stirred for 24 hours to be dissolved. The third component consists of a monomer mixture of methylmethacrylate benzylmethacrylate of the 95:5 weight ratio, which was mixed with 0.1% by weight of 2,2'-azo-bis(isobutyronitrile), as a polymerization initiator, and 0.5% by weight of n-butyl mercaptan, as a chain transfer agent, based on to the weight of the monomer mixture. Afterwards, the third component containing the preform pieces dissolved therein was filled in the rotatable reactor around the preform.

A producing appparatue including the resulting rotatable reactor was set as shown in FIG. 5. The rotatable reactor was rotated at a speed of 70 rpm for 4 hours, thereby dissolving the preform as the central rotating body into the third component.

Next, the rotatable reactor was separated from the system, and transferred into an oven. In the oven, the content in the rotatable reactor was polymerized by increasing slowly the temperature from 30° C. to 100° C. over 48 hours. The polymerized preform was recovered from the rotatable reactor and dried under a vacuum of 5 mmHg at 75° C. for 48 hours. When the produced preform was measured for its molecular weight by GPC, it was found that molecular weights at the central portion and periphery of the preform were 90,000 and 100,000, respectively, similar to each other. Moreover, measurement for a refractive index of the preform using an interference microscope showed that the refractive index at the central portion of the preform was about 1.524 which was radially gradually decreased from the central portion toward the peripheral portion having a refractive index of about 1.498.

The preform produced as described above was drawn according to the conditions as in Example 1, using a plastic optical fiber drawing apparatus. When the light loss of the optical fiber was measured under an LED light source using an actinometer, it was found to be 180 dB/km at a wavelength of 650 nm.

EXAMPLE 3

A monomer mixture consisting of methyl methacrylate trifluoroethyl methacrylate of a 70:30 weight ratio was mixed with 0.05% by weight of benzoyl peroxide, as a polymerization initiator, and 0.2% by weight of n-butyl mercaptan, as a chain transfer agent, based on to the weight of the monomer mixture. The resulting mixture was filled in a cylindrical mold having an inner diameter of 3 cm by filtration, and polymerized for 24 hours while elevating the temperature within the mold from 30° C. to 100° C.

After the completion of the polymerization, the produced central rotating body was recovered from the mold and dried under vacuum to remove unreacted monomers. Then, the central rotating body was mounted in the central portion of a rotatable reactor having a 5 cm diameter. After this, a central rotating body piece which was cut from the central rotating body before mounting the central rotating body in the rotatable reactor was added to a second component and dissolved. The second component consisted of a monomer mixture of methyl methacrylate and trifluoroethyl methacrylate of a 80:20 weight ratio, which mixture was mixed with 0.1% by weight of benzoyl peroxide, as a polymerization initiator, and 0.5% by weight of n-butyl mercaptan, as a chain transfer agent, based on to the weight of the monomer mixture. Afterwards, the second component containing the cut piece dissolved therein was filled in the rotatable reactor around the central rotating body.

A producing apparatus including the resulting rotatable reactor was set as shown in FIG. 5. The rotatable reactor was then maintained at about 30° C. while the central rotating body and the rotatable reactor were rotated at speeds of 20 rpm and 70 rpm, respectively, for one hour, thereby dissolving the solid, central rotating body into the second component.

Next, the rotatable reactor was separated from the system, and transferred into an oven. In the oven, the content in the rotatable reactor was polymerized by increasing slowly the temperature of the reactor from 30° C. to 100° C. over 48 hours. The polymerized preform was recovered from the rotatable reactor and dried under a vacuum of 5 mmHg at 75° C. for 48 hours. When the produced preform was measured for its molecular weight by GPC, the molecular weight found to be 100,000 at the central portion of the preform, and 110,000 at the peripheral portion.

Then, the produced preform as a central rotating body was mounted in the central portion of the rotatable reactor again. After this, a preform piece which was cut from the preform before mounting the preform in the rotatable reactor was added to a third component and stirred for 24 hours to be dissolved. The third component consists of a monomer mixture of methyl methacrylate and trifluoroethyl methacrylate of the 95:5 weight ratio, which was mixed with 0.1% by weight of benzoyl peroxide, as a polymerization initiator, and 0.5% by weight of n-butyl mercaptan, as a chain transfer agent, based on to the weight of the monomer mixture. Afterwards, the third component containing the preform piece dissolved therein was filled in the rotatable reactor around the preform.

A producing apparatus including the resulting rotatable reactor was set as shown in FIG. 5. The rotatable reactor was maintained at a temperature of about 30° C. while the central rotating body and the rotatable reactor were rotated in the same direction for 4 hours at speeds of 500 rpm and 70 rpm, respectively, thereby dissolving the preform as the central rotating body into the third component.

Next, the rotatable reactor was separated from the system, and transferred into an oven. In the oven, the content in the rotatable reactor was polymerized by increasing slowly the temperature from 30° C. to 100° C. over 24 hours. At this time, the polymerization was carried out under an oven pressure of 5 psi to smooth the polymerization. The polymerized preform was recovered from the rotatable reactor and dried under a vacuum of 5 mmHg at 75° C. for 48 hours. When the produced preform was measured for its molecular weight by GPC, it was found that molecular weights at the central portion and periphery of the preform were 90,000 and 100,000, respectively, that were similar to each other. Moreover, measurement for a refractive index of the preform using an interference microscope showed that the refractive index at the central portion of the preform was about 1.486 which was radially gradually decreased from the central portion toward the peripheral portion having a refractive index of about 1.471.

The preform produced as described above was drawn into an optical fiber according to the conditions as in Example 1, using a plastic optical fiber drawing apparatus. When the light loss of the optical fiber was measured under an LED light source using an actinometer, it was found to be 160 dB/km at a wavelength of 650 nm.

EXAMPLE 4

A monomer mixture consisting of methyl methacrylate and styrene of a 85:15 weight ratio was mixed with 0.1% by weight of 2,2-azo-bis(isobutyronitrile), as a polymerization initiator, and 0.5% by weight of n-butyl mercaptan, as a chain transfer agent, based on to the weight of the monomer mixture. The resulting mixture was filled in a cylindrical mold having an inner diameter of 3 cm by filtration, and polymerized for 24 hours while elevating the temperature of the mold from 30° C. to 100° C.

After the completion of the polymerization, the produced central rotating body was recovered from the mold and dried under vacuum to remove unreacted monomers. Then, the central rotating body was mounted in the central portion of a rotatable reactor having a 5 cm diameter. After this, the rotatable reactor was filled with a second component. The second component consisted of a monomer mixture of methyl methacrylate and styrene of the 90:10 weight ratio, which was mixed with 0.1% by weight of 2,2'-azo-bis (isobutyronitrile), as a polymerization initiator, and 0.5% by weight of n-butyl mercaptan, as a chain transfer agent, based on to the weight of the monomer mixture.

A producing apparatus including the resulting rotatable reactor was set as shown in FIG. 5. The rotatable reactor was then maintained at a temperature of about 40° C. while the rotatable reactor and the central rotating body was rotated in the clockwise direction for 4 hour at speeds of 700 rpm and 710 rpm, respectively, thereby dissolving the solid, central rotating body into the second component.

Following this, the rotatable reactor and the central rotating body was maintained at the same rotation speed of 300 rpm while the temperature of the rotatable reactor was increased slowly from 30° C. to 100° C. over 48 hours, thereby polymerizing the content of the rotatable reactor. The polymerized preform was recovered from the rotatable reactor and dried under a vacuum of 5 mmHg at 75° C. for 48 hours. When a molecular weight of the produced preform was measured by GPC, it was found that molecular weights at the central portion and periphery of the preform is 75,000 and 80,000, respectively, that were similar to each other. Moreover, measurement for a refractive index of the preform using an interference microscope showed that a refractive index at the central portion of the preform was about 1.451 which was radially gradually decreased toward the peripheral portion having a refractive index of about 1.415.

The preform produced as described above was drawn into an optical fiber according to the conditions in Example 1, using a plastic optical fiber drawing apparatus. When the light loss of the optical fiber was using an actinometer, it was found to be 190 dB/km at a wavelength of 650 nm under an LED light source.

EXAMPLE 5

A monomer mixture consisting of methyl methacrylate and benzyl methacrylate of a 60:40 weight ratio was mixed with 0.1% by weight of 2,2-azo-bis(isobutyronitrile), as a polymerization initiator, and 0.5% by weight of n-butyl mercaptan, as a chain transfer agent, based on to the weight of the monomer mixture. The resulting mixture was filled in a cylindrical mold having an inner diameter of 3 cm by filtration, and polymerized for 24 hours while elevating the temperature of the mold from 30° C. to 100° C.

After the completion of the polymerization, the produced central rotating body was recovered from the mold and dried under vacuum to remove unreacted monomers. Then, the central rotating body was mounted in the central portion of a rotatable reactor having a 6 cm diameter. After this, the rotatable reactor was filled with a second component. The second component consisted of a monomer mixture of methyl methacrylate and benzyl methacrylate of a 80:20 weight ratio, which was mixed with 0.1% by weight of 2,2'-azo-bis(isobutyronitrile), as a polymerization initiator, and 0.5% by weight of n-butyl mercaptan, as a chain transfer agent, based on to the weight of the monomer mixture.

A producing apparatus including the resulting rotatable reactor was set as shown in FIG. 5. The rotatable reactor was then maintained at a temperature of about 40° C., while the rotatable reactor and the central rotating body was rotated in the clockwise direction for 2 hour at speeds of 100 rpm and a sign function of 100+10 sin (10t) where t is a time in second, respectively. Thus, the solid, central rotating body was dissolved into the second component.

Following this, the rotatable reactor and the central rotating body was maintained at the same rotation speed of 500 rpm, while the temperature of the rotating reactor was increased slowly from 30° C. to 100° C. over 24 hours, thereby polymerizing the content of the rotatable reactor. The polymerized preform was recovered from the rotatable reactor and dried under a vacuum of 5 mmHg at 75° C. for 48 hours. When a molecular weight of the produced preform was measured by GPC, it was found that molecular weights at the central portion and periphery of the preform is 100,000 and 110,000, respectively, that were similar to each other. Moreover, measurement for a refractive index of the preform using an interference microscope showed that a refractive index at the central portion of the preform was about 1.533 which was radially gradually decreased toward the peripheral portion having a refractive index of about 1.515.

The preform produced as described above was drawn into an optical fiber according to the conditions in Example 1, using a plastic optical fiber drawing apparatus. When the light loss of the optical fiber was using an actinometer, it was found to be 180 dB/km at a wavelength of 650 nm under an LED light source.

As apparent from the foregoing, the present invention provides a producing method of objects having a refractive index which varies radially from the central portion of the objects to the peripheral portion thereof. Thus, the present invention provides a new method capable of producing the GI plastic optical fiber in a more easy and simple manner. Moreover, the present invention allows control of the refractive index distribution and thus supplies a base by which a plastic optical fiber having a very high information transmission speed can be provided.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A method of producing an object having a refractive index which varies radially from a central portion of the object toward a peripheral portion thereof, the method comprising the steps of:
   (a) mounting in a rotatable reactor on a central axis thereof a solid central rotating body formed by polymerizing a first component;
   (b) filling a liquid second component in the rotatable reactor around the central rotating body;
   (c) rotating the central rotating body and/or the rotatable reactor to subject the first component to a dissolution, diffusion, and radial mixing into the second component; and
   (d) polymerizing the dissolved first component and the second component.

2. The method of claim 1, further comprising the step of repeating one or more times the steps (a) to (d) while using a polymer of the first and second components produced in the step (d), as a central rotating body.

3. The method of claim 1, wherein step (b) further includes the step of dissolving polymer pieces cut from the central rotating body in the second component.

4. The method of claim 1, in which the central rotating body is mounted in a central portion of the rotatable reactor.

5. The method of claim 1, in which the central rotating and/or the rotatable reactor is/are rotated at a constant or variable speed.

6. The method of claim 5, in which the relative rotational speed of the central rotating body to the rotatable reactor is below a speed according to the following equation (4):

$$\Omega_C \cong \frac{40\eta}{\rho\sqrt{R_o \Delta R^3}} \quad (4)$$

wherein $\Omega_c$ is an upper limit for the rotational velocity, $\eta$ is a viscosity of the second component, $\rho$ is a density of the second component, and $\Delta R = R_o - R_i$ where $R_o$ is an inner diameter of the rotatable reactor and $R_i$ is an outer diameter of the central rotating body.

7. The method of claim 6, in which the relative rotational speed of the central rotating body to the rotatable reactor is in the range of 1 to 1,000 rpm.

8. The method of claim 1, in which the central rotating body has an outer diameter corresponding to 1% to 70% of an inner diameter of the rotatable reactor.

9. The method of claim 1, in which each of the first component and the second component contains at least one monomer, homopolymer, copolymer or a mixture thereof.

10. The method of claim 1, in which the second component has a lower refractive index than that of the first component.

11. The method of claim 9, in which the monomer is selected from the group consisting of methyl methacrylate, benzyl methacrylate, phenyl methacrylate, 1-methylcyclohexyl methacrylate, cyclohexyl methacrylate, chlorobenzyl methacrylate, 1-phenylethyl methacrylate, 1,2-diphenyl methacrylate, diphenylmethyl methacrylate, furfuryl methacrylate, 1-phenylcyclohexyl methacrylate, pentachlorophenyl methacrylate, pentabromophenyl methacrylate, styrene, perfluoro-2,2-diphenyl-1,3-dioxole, tetrafluoroethylene, chlorotrifluoroethylene, vinylidene fluoride, hexafluoropropylene, trifluoroethylene, perfluoroallylvinylether, and fluorovinylether.

12. The method of claim 9, in which the homopolymer is a homopolymer of a monomer selected from the group consisting methyl methacrylate, benzyl methacrylate, phenyl methacrylate, 1-methylcyclohexyl methacrylate, cyclohexyl methacrylate, chlorobenzyl methacrylate, 1-phenylethyl methacrylate, 1,2-diphenyl methacrylate, diphenylmethyl methacrylate, furfuryl methacrylate, 1-phenylcyclohexyl methacrylate, pentachlorophenyl methacrylate, pentabromophenyl methacrylate, styrene, perfluoro-2,2-diphenyl-1,3-dioxole, tetrafluoroethylene, chlorotrifluoroethylene, vinylidene fluoride, hexafluoropropylene, trifluoroethylene, perfluoroallylvinylether, and fluorovinylether.

13. The method of claim 9, in which the copolymer is one selected from the group consisting of a methyl methacrylate-benzyl methacrylate copolymer, a styrene-acrylonitrile copolymer, a methyl methacrylate-2,2,2-trifluoroethylmethacrylate copolymer, a methyl methacrylate-2,2,3,3,3-pentafluoropropylmethacrylate copolymer, a methyl methacrylate-1,1,1,3,3,3-hexafluoroisomethacrylate copolymer, a methyl methacrylate-2,2,3,3,4,4,4-heptafluorobutylmethacrylate copolymer, a 2,2,2-trifluoroethylmethacrylate-pentafluoropropylmethacrylate copolymer, a trifluoroethylmethacrylate-hexafluoroisomethacrylate copolymer, and a trifluoroethylmethacrylate-heptafluorobutylmethacrylate copolymer.

14. The method of claim 9, in which the copolymer is a bipolymer or terpolymer of perfluoro-2,2-dimethyl-1,3-dioxole as a first monomer and one or more monomers selected from the group consisting of tetrafluoroethylene, chlorotrifluoroethylene, vinylidenefluoride, hexafluoropropylene, trifluoroethylene, perfluoroallylvinylether and fluorovinylether, as a second monomer and/or a third monomer.

15. The method of claim 9, in which the copolymer is a bipolymer or terpolymer of perfluoroallylvinylether as a first monomer and one or more monomers selected from the group consisting of perfluoro-2,2-dimethyl-1,3-dioxole tetrafluoroethylene, chlorotrifluoroethylene, vinylidenefluoride, hexafluoropropylene, trifluoroethylene, and fluorovinylether, as a second monomer and/or a third monomer.

16. The method of claim 9, in which each of the first component and the second component additionally contains at least one polymerization initiator selected from the group consisting of 2,2'-azo-bis(isobutyronitrile), 1,1'-azo-bis(cyclohexanecarbonitrile), di-tert-butyl peroxide, lauroyl peroxide, benzoyl peroxide, tert-butyl peroxide, azo-tert-butane, azo-bis-isopropyl, azo-n-butane, and di-tert-butyl peroxide.

17. The method of claim 9, in which each of the first component and the second component additionally contains at least one chain transfer agent selected from the group consisting of n-butyl-mercaptan, lauryl mercaptan, and dodecyl mercaptan.

18. The method of claim 1, in which the step (c) is carried out at a temperature of −10° C. to 70° C.

19. The method of claim 1, in which the rotation in the step (c) is ceased at a point of time at which a central rotating body portion remaining after the dissolution of the central rotating body into the second component has a diameter corresponding to 0.1 to 90% of that of the initial central rotating body.

20. The method of claim 1, in which the polymerization in the step (d) is carried out at a temperature of 30° C. to 120° C. for 10 to 100 hours.

21. The method of claim 1, further comprising the step of drying a polymer from the step (d) under a vacuum of 5 mmHg at a temperature of 50° C. to 150° C. for 1 to 48 hours.

22. The method of claim 1, further comprising the step of forming a cladding layer, as a protecting layer, around a polymer from the step (d).

* * * * *